Oct. 14, 1969     J. F. SHERWOOD     3,472,268
ADAPTER FOR CONVERTING MANUALLY OPERATED VALVES
TO THERMALLY CONTROLLED OPERATION
Filed Nov. 9, 1967
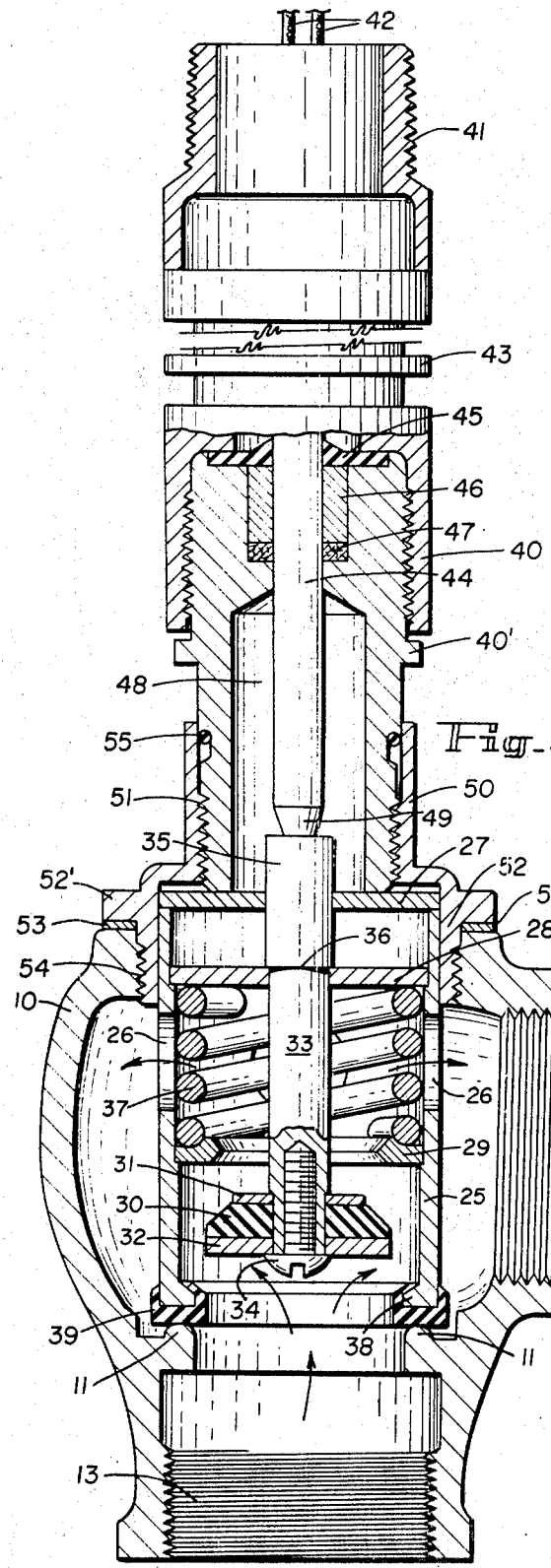
Fig_3
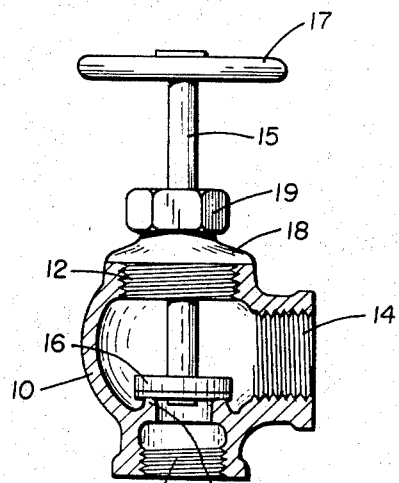
Fig_1
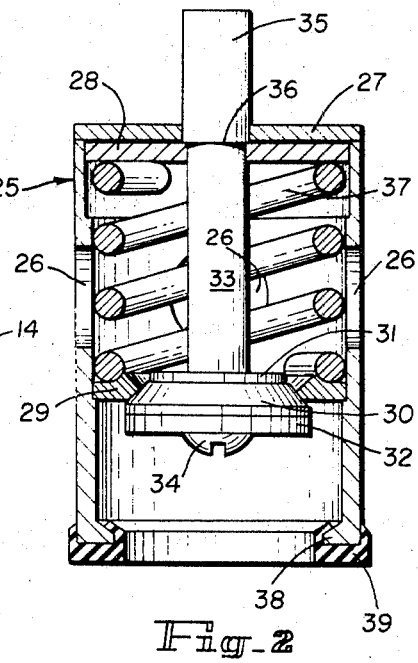
Fig_2
INVENTOR.
JOHN F. SHERWOOD
BY
*Bertha L. MacGregor*
ATTORNEY 3,472,268
ADAPTER FOR CONVERTING MANUALLY OPERATED VALVES TO THERMALLY CONTROLLED OPERATION
John F. Sherwood, Glendora, Calif., assignor to Clemar Manufacturing Corp, Azusa, Calif., a corporation of California
Filed Nov. 9, 1967, Ser. No. 681,865
Int. Cl. E03b; F16d; F16k 15/00
U.S. Cl. 137—269                                    8 Claims

ABSTRACT OF THE DISCLOSURE

In combination with a thermal motor having a reciprocated piston and a manually operated valve including a housing having a seat therein from which the old valve stem, valve plug and rotatable handle have been removed, an adapter for converting the valve to thermally controlled operation comprising a hollow adapter casing insertible in the valve housing and a bushing located between and connected to the old valve housing and the thermal motor.

The closed end of the adapter casing fits loosely in the bushing and the opposite open end is supported on the old valve seat in the valve housing. An annular valve seat is fixedly mounted on the inside of the adapter casing between its ends. The casing has openings in its side walls between the seat and closed end of the casing. A valve stem extends through the closed end of the adapter casing into the thermal motor, and the plug on the stem is located between the adapter seat and open end of the casing. When the motor is energized, the stem is actuated by the piston of the thermal motor to unseat the plug and open the valve. Yielding means located between the seat and closed end of the adapter casing urges the plug and stem to closed valve position when the thermal motor is deenergized.

Water flows from an inlet in the valve housing into the adapter casing, through the open valve seat, outwardly through the casing openings into the valve housing and then out through the outlet of the housing without modification of the old valve housing and original seat therein.

---

This invention relates to an adapter for converting manually operated valves to thermally controlled operation. The adapter is used in combination with a manually operated valve housing having a seat fixed therein from which the old valve stem, valve plug, cap nut and rotatable handle have been removed. The adapter comprises an adapter casing and a bushing which has means for connecting the bushing to the old valve housing and to a thermal motor. The adapter casing has a closed end and an open end, and preferably is cylindrical in form. The closed end of the adapter casing fits loosely in the bushing and the opposite open end is supported on the old valve seat.

The main object of the invention is to provide an adapter which can be installed easily in the housing of an existing manually operated valve, including a separate bushing which has means for connecting the bushing to the old valve housing and to a thermal motor. The thermal motor may be of the type well known in the art comprising a high pressure casing, expansible material and a piston in the casing, and electrical means for heating the expansible material and actuating the piston. The adapter casing contains a valve seat, valve plug and valve stem, the latter being actuated by the piston to move the plug to unseated open valve position.

By installation of the adapter of this invention, existing manually operated valves can be converted quickly and easily to automatic thermoelectrically controlled operation. The conversion may be achieved if desired without disconnecting the old valves from underground irrigation systems or other installations, and existing thermal motors may be used with the adapter to produce the new combination.

In the drawings:

FIG. 1 is a vertical sectional view, partly in elevation, of a conventional manually controlled valve.

FIG. 2 is a vertical sectional view, on an enlarged scale, of the adapter embodying my invention, detached from the rest of the mechanism, showing the valve plug in valve closing position.

FIG. 3 is a vertical sectional view, on an enlarged scale, of a conventional manually operated valve which has been converted to an automatic thermoelectrically controlled valve by embodying therein the adapter of my invention and a thermal motor, the valve plug in the adapter being shown in unseated valve opening position.

In the embodiment of the invention shown in the drawings, the housing 10 of a manually operated valve has a fixed seat 11 in its lower portion, an internally threaded neck 12 in its upper portion, an internally threaded intake member 13 and internally threaded outlet 14. The old valve stem 15 has a plug 16 on its lower end adapted to bear on the seat 11, and a handle 17 on its upper end. The cap 18, nut 19, together with the stem 15, plug 16 and handle 17 are removed for the purpose of converting the original valve to thermoelectrical control. The housing 10 and valve seat 11 are retained, but in the conversion the seat 11 serves as a support for the adapter casing and not as a valve plug seat.

The adapter comprises a casing 25, preferably hollow cylindrical in form, having openings 26 in its side walls and having an end closed by a wall or washer 27. A slidable stop washer 28 is located in the adapter casing 25, inwardly of the closed end 27. An annular valve seat 29 is fixed on the inner surface of the adapter casing 25, between the slidable washer 28 and the open end of the casing. The valve plug consists of a disc 30, washer 31 and bottom plate 32, fastened to the end of the valve stem 33 by screw 34. The valve stem 33 has an end 35 larger in diameter than the rest of the stem, thus providing a shoulder 36 which bears on the stop washer 28. A coiled spring 37 bears at one end on the washer 28 and at its other end on the seat 29. The adapter casing 25 has an inturned flange 38 on its open end, covered by a rubber sealing ring 39. When the adapter casing 25 and associated parts are installed in the old valve housing 10, the inturned flange 38 covered by the sealing ring 39 bears on the old valve seat 11.

Referring to FIG. 3, the thermal motor shown herein comprises a high pressure casing 40 and a bearing housing 40' connected together by threads. The casing 40 contains expansible material, such as wax or other suitable compound. An externally threaded top ring is indicated at 41 on the end of the casing 40. Electrical leads 42 conduct current to the heating element (not shown) in casing 40 which has radiation fins 43. A reciprocating piston 44 extends from the inside of the casing 40 through a piston seal 45, piston bearing 46 and lubricant seal 47, into piston chamber 48, with its tapered end 49 positioned to bear on the end of the valve stem 35.

A bushing 50 surrounds the upper end of the adapter casing 25 and the lower end of the thermal motor housing 40'. The internal threads 51 on the bushing 50 connect it to the housing 40'. The bushing has a larger diameter lower portion 52 and shoulder flange 52'. A gasket 53 bears on the top of the old valve housing 10 and beneath the flange 52'. The externally threaded neck 54 of the bushing engages threads 12 on the old valve housing. An O-ring 55 provides a seal between the bushing and the thermal motor housing.

When the parts are assembled as shown in FIG. 3, and the thermal motor has been energized to actuate its piston 44, the valve stem 33–35 moves downwardly to unseat the plug 30 from the seat 29, thereby opening the valve. This movement also forces the stop washer 28 toward the valve seat 29, compressing the spring 37. Water or other fluid then flows from the intake 13 into the adapter casing 25, then out through the openings 26 into the old valve housing 10, to the outlet 14. When the thermal motor is de-energized, the expansible material therein cools, whereupon the pressure of the incoming water aided by the expansive pressure of the spring bearing on the slidable washer 28 causes the latter to bear against shoulder 36 and to move the valve stem 33–35 with plug 30 to seat the plug on the seat 29 to close the valve as shown in FIG. 2.

For convenience in identifying the opposite ends of the adapter 25, the upper end has been called the closed end of the adapter body and the opposite lower end has been described as the open end of the body. The upper part 27 may be a washer. A closed end wall is not vital to the structure.

As shown in FIG. 3, the lower end of the bearing housing 40' is in contact with the top 27 of the adapter housing 25. The housing 40' may be turned to bear at its lower end on the adapter washer or top 27 and thus tighten the seating of the adapter through resilient member 39 on the old valve seat 11.

I claim:

1. In combination with an electrothermal motor having a reciprocated piston and a manually operated valve including a housing having a seat therein from which the valve plug, stem and rotatable handle have been removed, an adapter for converting the manually operated valve to an electrothermally controlled valve comprising
    (a) a hollow adapter casing provided with a closed end and an opposite open end supported on said housing seat,
    (b) an annular valve seat fixedly mounted in the adapter casing between its ends,
    (c) a valve stem extending through the casing closed end into contact with the motor piston for actuation by the piston into valve opening position,
    (d) a valve plug on the stem,
    (e) yielding means urging the valve plug to bear on the seat in the adapter casing to close the valve, and
    (f) means connecting the valve housing to the thermal motor.

2. The combination defined by claim 1, in which the adapter casing is cylindrical in form and provided with openings in itn cylindrical wall between its closed end and valve seat.

3. The combination defined by claim 1, which includes a stop washer mounted on the valve stem and slidable in the adapter casing, and in which said yielding means is a coiled spring which bears at one end on the valve seat and on its other end on said slidable washer to move the valve stem and plug into valve closing position.

4. The combination defined by claim 1, in which the adapter casing is cylindrical in form and provided on its open end with a resilient covering supported by the housing heat.

5. The combination defined by claim 1, in which the means connecting the valve housing to the thermal motor is a bushing threadedly connected to the thermal motor and to the valve housing.

6. The combination defined by claim 1, in which the means connecting the valve housing to the thermal motor is a bushing having a neck portion internally threaded to engage the thermal motor, and having a larger diameter portion adapted to receive the closed end portion of the adapter casing and externally threaded to engage the valve housing.

7. In combination with an electrothermal motor having a reciprocated piston exposed at one end of the motor and a manually operated valve including a housing having an open end and a seat therein aligned with said open end from which the valve plug, stem and rotatable handle have been removed, an adapter for converting the manually operated valve to an electrothermally controlled valve comprising
    (a) a hollow cylindrical adapter casing having openings through its cylindrical wall, provided with a closed end and an opposite open end,
    (b) means sealingly supporting said open end of the adapter casing on the seat in the valve housing,
    (c) annular valve seat fixedly mounted in the adapter casing between its ends,
    (d) a valve stem extending through the casing closed end into contact with the motor piston for actuation by the piston into valve opening position,
    (e) a valve plug fixed on the stem,
    (f) yielding means for urging the valve plug into valve closing position on the seat in the adapter casing, and
    (g) means enclosing the closed end of the adapter casing and connected to the thermal motor and to the valve housing for holding the motor, valve housing and adapter in assembled relationship.

8. The combination defined by claim 7, in which the means connected to the thermal motor and to the valve housing is a bushing having an internally threaded neck which engages the outer surface of the thermal motor and having an externally threaded portion which engages threads on the valve housing.

References Cited

UNITED STATES PATENTS

| | | | |
|---|---|---|---|
| Re. 7,886 | 9/1877 | Bailey | 137—269 |
| 41,471 | 2/1864 | Bailey | 137—269 |
| 77,690 | 5/1868 | White | 137—269 |
| 449,222 | 3/1891 | Kimball | 137—269 |
| 2,575,100 | 11/1951 | Duey. | |
| 2,627,387 | 2/1953 | Buickerood | 137—269 XR |
| 2,996,075 | 8/1961 | Deimer et al. | 137—269 XR |
| 3,253,610 | 5/1966 | Pahl et al | 137—269 |

HENRY T. KLINKSIEK, Primary Examiner

R. J. MILLER, Assistant Examiner

U.S. Cl. X.R.

137—454.5